United States Patent
Watanabe

(10) Patent No.: US 9,571,742 B2
(45) Date of Patent: Feb. 14, 2017

(54) IMAGE CAPTURE APPARATUS AND CONTROL METHOD THEREOF

(71) Applicant: CANON KABUSHIKI KAISHA, Tokyo (JP)

(72) Inventor: Shinobu Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/184,891

(22) Filed: Feb. 20, 2014

(65) Prior Publication Data
US 2014/0253792 A1    Sep. 11, 2014

(30) Foreign Application Priority Data
Mar. 6, 2013  (JP) ................................ 2013-044716

(51) Int. Cl.
*H04N 5/235* (2006.01)
*H04N 5/232* (2006.01)
*H04N 5/355* (2011.01)

(52) U.S. Cl.
CPC .......... *H04N 5/2353* (2013.01); *H04N 5/2355* (2013.01); *H04N 5/23219* (2013.01); *H04N 5/23229* (2013.01); *H04N 5/35581* (2013.01)

(58) Field of Classification Search
CPC ............... H04N 5/2355; H04N 5/355–5/3559; G06T 5/007–5/009; G06T 2207/20208
USPC ............ 348/220.1, 221.1, 223.1, 229.1, 345, 349,348/353, 354, 362, 364, 365
See application file for complete search history.

(56) References Cited

U.S. PATENT DOCUMENTS

| | | | |
|---|---|---|---|
| 5,929,908 A * | 7/1999 | Takahashi et al. | 348/364 |
| 7,595,823 B2 * | 9/2009 | Yen et al. | 348/239 |
| 7,903,168 B2 * | 3/2011 | Pillman | H04N 5/23212 348/345 |
| 8,830,341 B2 * | 9/2014 | Pore | 348/222.1 |
| 2004/0252217 A1 * | 12/2004 | Battles et al. | 348/333.01 |
| 2006/0221223 A1 * | 10/2006 | Terada | 348/333.05 |

(Continued)

FOREIGN PATENT DOCUMENTS

| CN | 1452386 A | 10/2003 |
|---|---|---|
| CN | 101674417 A | 3/2010 |

(Continued)

OTHER PUBLICATIONS

The above foreign references were cited in a Oct. 24, 2016 Chinese Office Action, a copy of which is enclosed with an English Translation, that issued in Japanese Patent Application No. 201410080011.5.

(Continued)

*Primary Examiner* — Lin Ye
*Assistant Examiner* — Chriss Yoder, III
(74) *Attorney, Agent, or Firm* — Cowna, Liebowitz & Latman, P.C.

(57) ABSTRACT

Evaluation values relating to image capture are detected from at least two out of a plurality of images having different exposure amounts, which are used to generate a composite image. From a plurality of detected evaluation values relating to image capture, an evaluation value relating to image capture used to control an operation of an image capture apparatus is selected under a predetermined operation, thereby improving the detection accuracy of evaluation values relating to image capture in an HDR moving image capture operation.

7 Claims, 13 Drawing Sheets

(56) References Cited

U.S. PATENT DOCUMENTS

2014/0307117 A1* 10/2014 Feng .................. H04N 5/2351
                                                       348/218.1

FOREIGN PATENT DOCUMENTS

| JP | 11-164195 A | 6/1999 |
|----|---|---|
| JP | 2009-071666 A | 4/2009 |
| JP | 2009-218895 A | 9/2009 |
| JP | 2011-232671 A | 11/2011 |
| JP | 2011-244309 A | 12/2011 |
| JP | 2012-010307 A | 1/2012 |
| WO | 2006/049098 A1 | 11/2006 |

OTHER PUBLICATIONS

The above foreign references were cited in a Nov. 11, 2016 Japanese Office Action, a copy of which is enclosed without an English Translation, that issued in Japanese Patent Application No. 2013-044716.

* cited by examiner

FIG. 6

| FACE INFORMATION [X] | Xh > Xl | | | | Xh ≤ Xl | | | |
|---|---|---|---|---|---|---|---|---|
| LUMINANCE INFORMATION [Y] | Yh > Yl | | Yh ≤ Yl | | Yh > Yl | | Yh ≤ Yl | |
| COLOR INFORMATION [Z] | Zh > Zl | Zh ≤ Zl | Zh > Zl | Zh ≤ Zl | Zh > Zl | Zh ≤ Zl | Zh > Zl | Zh ≤ Zl |
| EVALUATION VALUE RELATING TO IMAGE CAPTURE | α | — | — | β | α | β | β | — |
| SCENE DETERMINATION RESULT | | | | TUNNEL | BACKLIT | | | |

IMAGE CAPTURE APPARATUS AND CONTROL METHOD THEREOF

BACKGROUND OF THE INVENTION

Field of the Invention

The present invention relates to an image capture apparatus and control method thereof and, more particularly, to an image capture apparatus which can capture a moving image, a dynamic range of which is expanded, and a control method thereof.

Description of the Related Art

Conventionally, an image sensor (CCD image sensor, CMOS image sensor, or the like) used in a general digital camera suffers a problem of a narrower dynamic range (an input luminance range expressible by output values) than a silver halide film. As a method of obtaining an image having a dynamic range broader than that of the image sensor, a technique called "HDR (High Dynamic Range)" is known. The HDR is a method of generating one image (HDR image) by compositing a plurality of images (for example, an overexposure image, underexposure image, and the like) which are obtained by capturing a single scene using different exposure amounts (Japanese Patent Laid-Open No. 11-164195).

Also, in recent years, a technique for generating an HDR image using an image sensor, which can capture a plurality of images having different exposure amounts in an image capture operation for one frame period, has been proposed, and application to HDR image generation in a moving image capture operation has also been referred to (Japanese Patent Laid-Open No. 2011-244309).

In an HDR moving image capture operation for generating a frame image by compositing a plurality of images, when evaluation vales relating to image capture, which are required for image capture are detected from a composite image, a reflection timing of the evaluation values relating to image capture is delayed. This problem is posed in the arrangement which acquires a plurality of images having different exposure amounts for a plurality of frame periods, as described in Japanese Patent Laid-Open No. 11-164195, and also in the arrangement which can acquire a plurality of images having different exposure amounts within one frame period, as described in Japanese Patent Laid-Open No. 2011-244309. Note that the evaluation values relating to image capture include an AF (Auto Focus detection) evaluation value, AE (Auto Exposure control) evaluation value, WB (White Balance) evaluation value, and the like.

For example, a case will be examined wherein an AF control operation is executed based on an AF evaluation value during an image capture operation of an HDR moving image. In this case, when an arrangement for executing the AF control operation using the AF evaluation value detected from a composite image is adopted, a reflection timing of the AF evaluation value comes after image composition, resulting in poor AF response to motions of a subject. For this reason, it is desired to detect and reflect the AF evaluation value using images before composition.

However, in an arrangement which detects evaluation values relating to image capture always using one of images before composition (for example, an overexposure image having a large exposure amount and an underexposure image having a small exposure amount), accurate evaluation values relating to image capture cannot often be detected due to the relation between the exposure amount and image capture scene. For example, in a very dark scene in which an image of a person is captured with the night view in the background, accurate evaluation values relating to image capture cannot be detected from the underexposure image. Alternatively, when a subject suffers a shadow-detail loss or highlight-detail loss since an image capture scene is sufficiently bright and has a broad dynamic range, accurate evaluation values relating to image capture cannot be detected from the overexposure image.

The same problem is posed in a backlit scene (in which the background of a principal subject is very bright), a tunnel scene (in which the background is dark, and an occupation area of a principal subject is small), and the like.

SUMMARY OF THE INVENTION

The present invention has been made in consideration of the aforementioned problems of the related arts, and provides an image capture apparatus which can improve the detection accuracy of evaluation values relating to image capture in an HDR moving image capture operation, and a control method thereof.

According to an aspect of the present invention, there is provided an image capture apparatus comprising: an image capture unit that captures a plurality of images having different exposure amounts; an exposure control unit that controls an exposure of the image capture unit; an evaluation value detection unit that detects evaluation values relating to image capture from at least two out of the plurality of images having the different exposure amounts obtained by the image capture unit; a selection unit that selects, under a predetermined condition, an evaluation value relating to image capture used to control an operation of the image capture apparatus from a plurality of evaluation values relating to image capture detected by the evaluation value detection unit; and a control unit that controls the operation of the image capture apparatus based on the evaluation value relating to image capture selected by the selection unit.

According to another aspect of the present invention, there is provided a control method of an image capture apparatus which comprises image capture unit that captures a moving image, comprising: a setting step of setting an exposure condition of the image capture unit so as to capture a plurality of images having different exposure amounts, which are to be used to generate a composite image; an evaluation value detection step of detecting evaluation values relating to image capture from at least two out of the plurality of images having the different exposure amounts obtained by the image capture unit; a selection step of selecting, under a predetermined condition, an evaluation value relating to image capture used to control an operation of the image capture apparatus from a plurality of evaluation values relating to image capture detected in the evaluation value detection step; and a control step of controlling the operation of the image capture apparatus based on the evaluation value relating to image capture selected in the selection step.

Further features of the present invention will become apparent from the following description of exemplary embodiments with reference to the attached drawings.

BRIEF DESCRIPTION OF THE DRAWINGS

FIG. 6 is a table showing a selection example of evaluation values relating to image capture in the image capture apparatus according to the second embodiment of the present invention;

DESCRIPTION OF THE EMBODIMENTS

Exemplary embodiments of the present invention will now be described in detail in accordance with the accompanying drawings.

First Embodiment

In this specification, evaluation values relating to image capture are parameters required upon controlling an image capture apparatus and application of correction and the like to captured images, and are those acquired from the captured images. For example, an AF (Auto Focus detection) evaluation value, WB (White Balance) evaluation value, AE (Auto Exposure control) evaluation value, and the like are representative evaluation values relating to image capture, but the present invention is not limited to these specific values.

The AF evaluation value (focus evaluation value) is used to bring an optical system in focus with a subject, and is mainly required to control the position of a focusing lens.

The WB evaluation value (white balance evaluation value) is used to correct a color tone of a captured image, and is a parameter required for developing processing.

The AE evaluation value (exposure evaluation value) is required to automatically adjust an exposure condition of an image capture operation, and is mainly used to set an aperture, shutter speed, and sensitivity.

Figure 1:
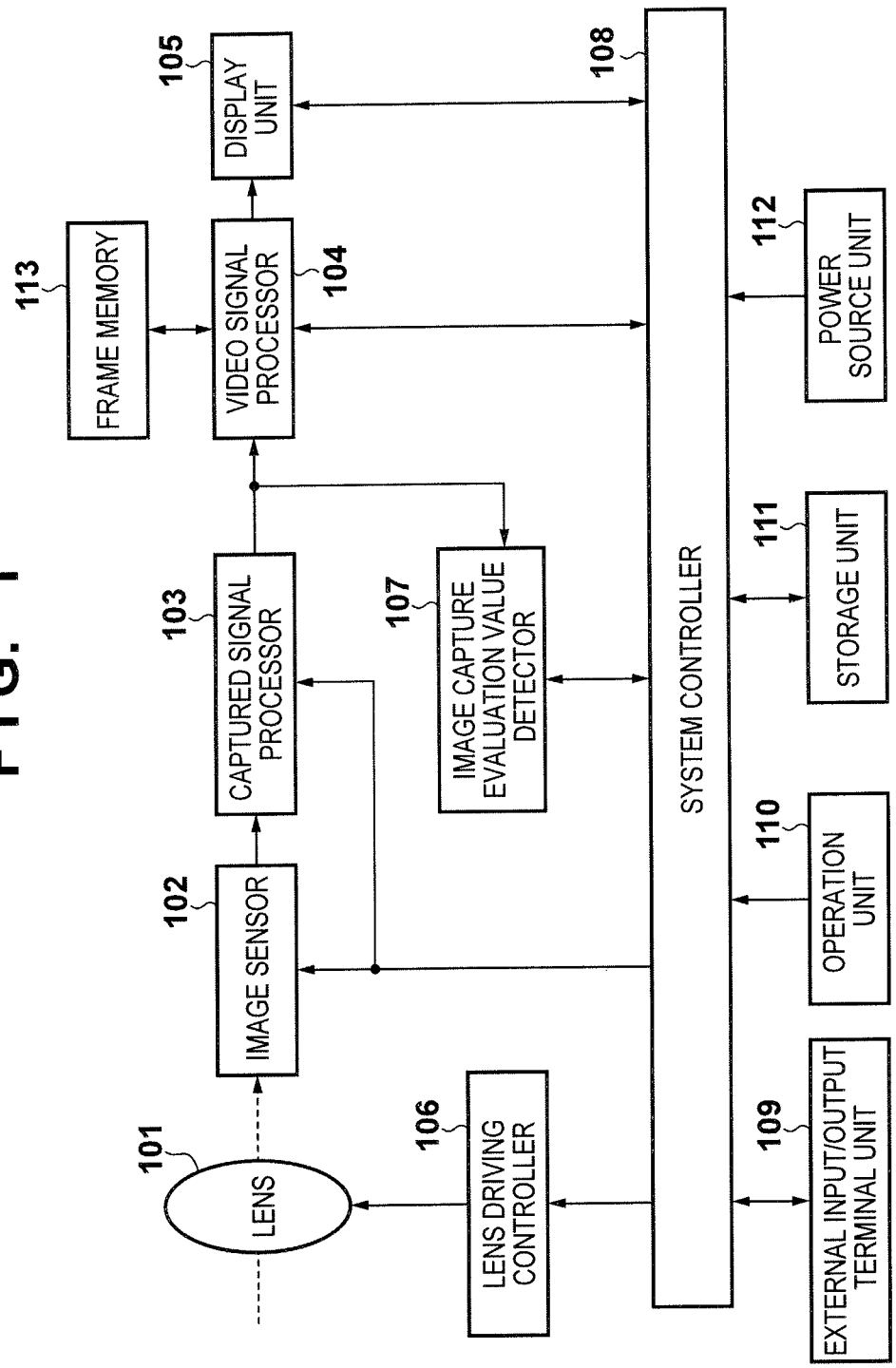
FIG. 1 is a block diagram showing an example of the functional arrangement of an image capture apparatus according to the first embodiment of the present invention.

FIG. 1 is a block diagram showing an example of the functional arrangement of an image capture apparatus according to this embodiment.

A lens 101 is a lens group which configures an optical system, and includes a focusing lens used to adjust an in-focus distance. The position of the focusing lens can be changed along an optical axis direction, and a system controller 108 controls the position of the focusing lens via a lens driving controller 106 based on the AF evaluation value detected by an image capture evaluation value detector 107.

Light which enters via the lens 101 forms an optical image of a subject on an imaging surface of an image sensor 102 including a CCD or CMOS image sensor and the like.

The image sensor 102 converts light which enters each pixel into a charge, converts an optical image of a subject into an electrical signal for each pixel, and outputs the electrical signal.

A captured signal processor 103 applies signal processing such as A/D conversion to the electrical signals output from the image sensor 102, and outputs the processed signals as image data. Note that the captured signal processor 103 may be embedded as a peripheral circuit of the image sensor 102.

The image capture evaluation value detector 107 detects a predetermined evaluation value relating to image capture from image data output from the captured signal processor 103. In this case, the image capture evaluation value detector 107 detects evaluation values relating to image capture from an overexposure image and underexposure image before HDR processing at an output timing from the system controller 108, and selects one of the evaluation values relating to image capture (details will be described later).

Then, the system controller 108 determines a control amount of the lens 101 (focusing lens) based on an AF evaluation value of the detected evaluation values relating to image capture, and outputs this control amount to the lens driving controller 106.

The lens driving controller 106 drives the focusing lens included in the lens 101 in the optical axis direction based on the control amount from the system controller 108, thereby adjusting an in-focus distance of the lens 101.

A frame memory 113 stores image data input to a video signal processor 104. The video signal processor 104 generates an HDR image by applying predetermined processing to the image data stored in the frame memory 113, and outputs an image signal which can be displayed on a display unit 105.

The video signal processor 104 outputs an image signal for each frame of a moving image output from the image sensor 102 or for the predetermined number of frames.

The system controller 108 is a programmable processor such as a CPU (Central Processing Unit), and controls the overall image capture apparatus according to programs stored in a ROM and the like. More specifically, the system controller 108 controls the processes of the lens driving controller 106, image sensor 102, captured signal processor 103, video signal processor 104, and image capture evaluation value detector 107. Also, the system controller 108 controls the display unit 105, an external input/output terminal unit 109, an operation unit 110, a storage unit 111, and a power source unit 112.

The external input/output terminal unit 109 is an external interface required to connect an external device to the image capture apparatus, and includes, for example, connectors which comply with the HDMI and USB standards, and the like.

The operation unit 110 is an input device group required for the user to input instructions and settings to the image capture apparatus. The operation unit 110 includes a release button, record/play mode switching switch, arrow keys, determination/execution key, menu button, and the like, that is, buttons, keys, and the like, which are generally included in the image capture apparatus. Note that an arrangement required to implement an input method without any hardware keys such as a touch panel and speech input is also included in the operation unit 110.

The storage unit 111 includes a recording medium, and records a captured moving image and still image in the recording medium. The recording medium may be of a detachable type (for example, a semiconductor memory card or the like) or of a fixed type (an internal drive), or both of them.

The power source unit 112 includes, for example, a secondary battery and power source circuit, and supplies a power supply voltage required to drive the respective units of the image capture apparatus.

HDR moving image generation processing according to this embodiment will be described below. Note that the moving image capture operation includes not only that of an image to be recorded but also that of a live view image, which is captured to be displayed on the display unit 105 in an image capture standby mode. In this embodiment, for the sake of simplicity and easy understanding, two images having different exposure amounts are composited to generate an HDR image (moving image frame). Alternatively, three or more images may be used to generate one HDR image. Note that in the following description, an overexposure image captured using an exposure amount larger than a standard exposure amount will be referred to as a High image, an image captured using the standard exposure amount will be referred to as a Middle image, and an underexposure image captured using an exposure amount smaller than the standard exposure amount will be referred to as a Low image.

Figure 2:
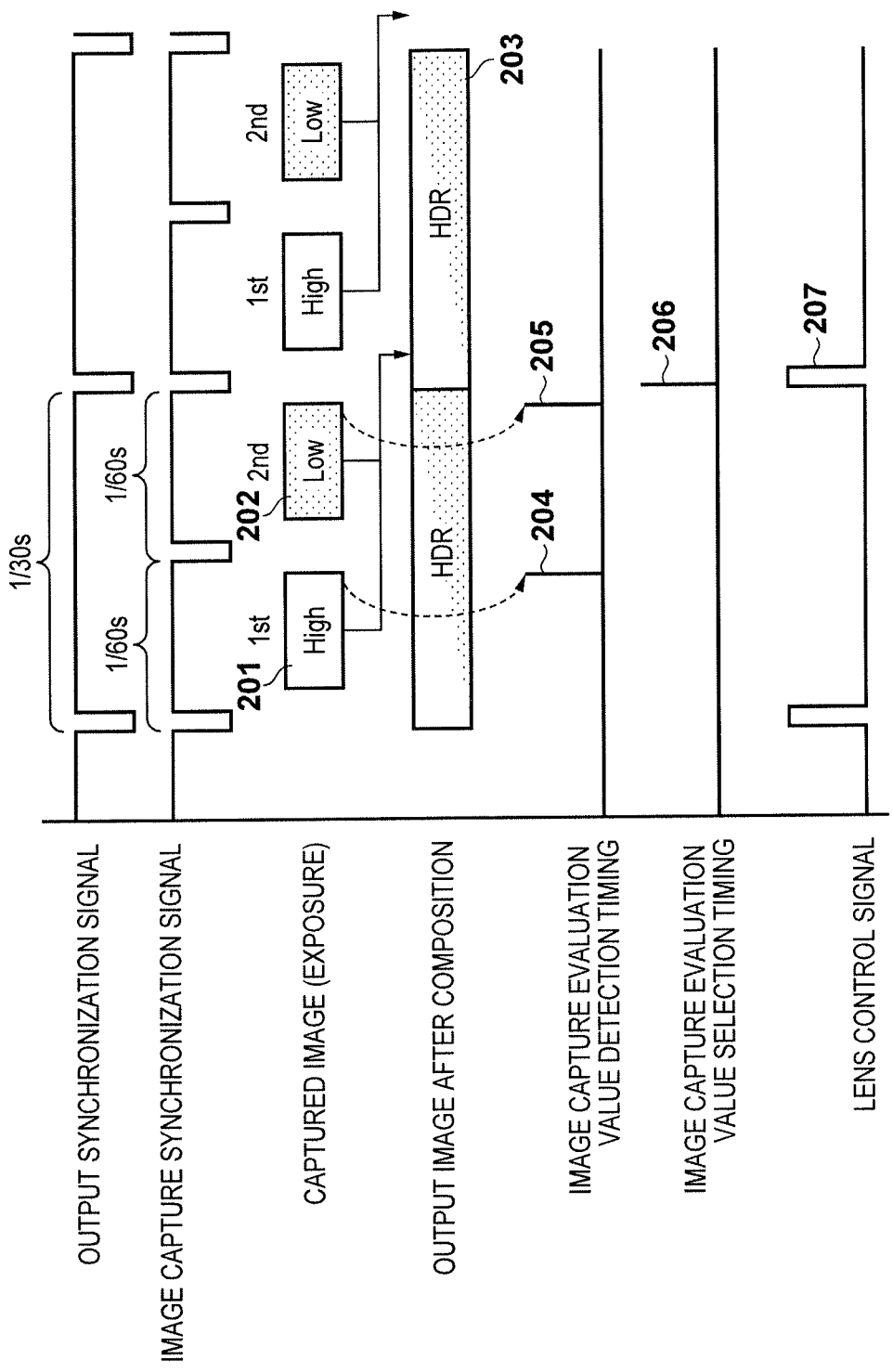
FIG. 2 is a timing chart for explaining operation timings of an HDR moving image capture operation in the image capture apparatus according to the first embodiment of the present invention.

FIG. 2 is a timing chart for explaining the operation timings in the HDR moving image capture operation in the image capture apparatus of this embodiment. Assume that a frame rate of an HDR moving image is 30 frames/sec (fps). Since one frame of the HDR moving image is generated from two images, an image capture frame rate is 60 fps. Note that these frame rates are examples, and other frame rates may be used.

The system controller 108 generates timing pulses using internal clocks. Image capture operations at 60 fps are executed in synchronism with image capture synchronization signals at 1/60s cycles.

In this embodiment, the system controller 108 alternately executes image capture operations of a High image 201 and Low image 202. In this case, assume that, for example, the High image is an overexposure image captured under an exposure condition Ev(H), which is brighter by one level (+1 level) than a standard exposure level Ev(0), and the Low image is an underexposure image captured under an exposure condition Ev(L) which is darker by one level (−1 level) than the standard exposure level.

The captured image is temporarily stored in the frame memory 113. When the High image 201 and Low image 202 are obtained, the video signal processor 104 composites the two images at the next frame cycle to generate an HDR image 203. Note that the HDR image 203 can be generated from the High image 201 and Low image 202 using a known method.

The image capture evaluation value detector 107 detects predetermined evaluation values relating to image capture respectively from the High image 201 and Low image 202 according to image capture evaluation value extraction timings 204 and 205 output from the system controller 108.

Furthermore, the image capture evaluation value detector 107 selects an evaluation value relating image capture, which is determined to be more appropriate than the other so as to be used in the HDR moving image capture operation, according to an image capture evaluation value selection timing 206 output from the system controller 108.

When evaluation values relating to image capture are to be obtained from a composite image, they are obtained after composition processing. However, in this embodiment, evaluation values relating to image capture can be selected and reflected at a timing before the beginning of the composition processing, thus improving the response of processing which uses the evaluation values relating to image capture.

The system controller 108 controls the focusing lens position via the lens driving controller 106 based on an AF evaluation value of the evaluation values relating to image capture selected at an image capture evaluation value selection timing, thereby adjusting an in-focus distance of the lens 101. The system controller 108 executes control of the focusing lens position within one cycle of a lens control timing 207, that is, one cycle (1/30 sec) of an output synchronization signal.

The HDR moving image capture operation of the image capture apparatus according to this embodiment will be described in detail below with reference to the flowchart shown in FIG. 3. Note that in the following description, let α be an evaluation value relating to image capture detected from the High image, and β be an evaluation value relating to image capture detected from the Low image.

When the power source is turned on by operating, for example, a power switch of the operation unit 110 (step S301), the power source unit 112 supplies a power supply voltage to the respective units. The system controller 108 executes various initial settings (step S302), and is set in an image capture standby state.

When a record button or the like of the operation unit 110 is operated in this state, an image capture operation of a moving image to be recorded is started. Alternatively, an image capture operation of a live view video to be displayed on the display unit 105 in the standby state is started without any operation of the record button (step S303). In this embodiment, assume that the HDR moving image capture operation is executed in either case, and the following description will be given without any distinction of a live view video or video to be recorded.

The system controller 108 calculates a standard exposure condition by a known arbitrary method, and determines the High image exposure condition Ev(H) of +1 level and the Low image exposure condition Ev(L) of −1 level with reference to this standard exposure condition (step S304). Assume that in this case, the conditions Ev(H) and Ev(L) are determined by adjusting a shutter speed (and also sensitivity as needed) by +1 level and −1 level from the standard exposure condition. Also, assume that the system controller 108 controls the shutter speed by controlling a charge accumulation time period in the image sensor 102.

In step S305, the system controller 108 executes an image capture operation according to the exposure condition Ev(H) determined in step S304. The system controller 108 saves a High image obtained by the image capture operation in the frame memory 113, and supplies that image to the image capture evaluation value detector 107. The image capture evaluation value detector 107 detects an evaluation value α relating to image capture from the High image (step S306).

In step S307, the system controller 108 executes an image capture operation according to the exposure condition Ev(L) determined in step S304. The system controller 108 saves a Low image obtained by the image capture operation in the frame memory 113, and supplies that image to the image capture evaluation value detector 107. The image capture evaluation value detector 107 detects an evaluation value β relating to image capture from the Low image (step S308).

In step S309, the video signal processor 104 starts composition processing for generating an HDR image (HDR moving image frame) from the High and Low images saved in the frame memory 113.

In step S310, the video signal processor 104 executes developing processing of the HDR image generated in step S309. After the developing processing, the moving image is recorded in the storage unit 111 or a live view video is displayed on the display unit 105. Note that the HDR image recorded or displayed in step S310 is a composite image of the High and Low image captured at an immediately preceding frame cycle, as shown in FIG. 2.

If a moving image capture end instruction (for example, a recording operation end instruction or a transition instruction to an operation mode without any live view display operation) is input in step S311, the system controller 108 ends the processing. On the other hand, if the image capture operation is to be continued, the process advances to step S312.

In steps S312 to S314, the image capture evaluation value detector 107 selects one of evaluation values relating to image capture, which is determined to be more suitable, based on the comparison result of the evaluation value α relating to image capture detected from the High image in step S306 and the evaluation value β relating to image capture detected from the Low image in step S308.

For example, assume that an evaluation value relating to image capture is an AF evaluation value for automatic focus detection of a contrast detection method (contrast AF). In this case, the AF evaluation value represents a degree of contrast, and as the AF evaluation value is higher (larger), it means that the optical system is closer to an in-focus state. Therefore, as a contrast of an image is larger, a higher AF evaluation value is obtained.

For example, when a backlit scene is captured, a contrast (AF evaluation value) of a subject is high in the High image and is low in the Low image.

If it is determined in step S312 that the evaluation value α relating to image capture detected from the High image is not less than the evaluation value β relating to image capture detected from the Low image (α≥β), the image capture evaluation value detector 107 selects the evaluation value α relating to image capture detected from the High image in step S313. On the other hand, if it is determined in step S312 that the evaluation value β relating to image capture detected from the Low image is higher (α<β), the image capture evaluation value detector 107 selects the evaluation value β relating to image capture detected from the Low image in step S314. Note that when three or more images are to be composited, the highest evaluation value can be selected.

Then, the processing is repeated from step S304.

The system controller 108 controls the operation of the image capture apparatus based on the selected evaluation value relating to image capture. When the evaluation value relating to image capture is the AF evaluation value, the system controller 108 controls the focusing lens at the lens control timing 207, as shown in FIG. 2. Note that how to control the focusing lens based on the AF evaluation value is not particularly limited, and a known method can be used.

As described above, according to this embodiment, when evaluation values relating to image capture, which are detected while capturing an HDR moving image, are required to be used, a suitable evaluation value relating to image capture is dynamically selected and used from those detected from a plurality of images before composition in place of those detected from an HDR image after composition. For this reason, a time period required when evaluation values relating to image capture are obtained after images to be composited are captured can be shortened, thus allowing control with the quick response. Also, since an optimal evaluation value relating to image capture of those detected from a plurality of images before composition can be used, the control accuracy can be improved compared to a case in which evaluation values relating to image capture detected from an image captured in a specific order of a plurality of images before composition are used.

Note that the AF evaluation value has been described as an example of evaluation values relating to image capture in this embodiment. To other evaluation values relating to image capture, for example, a white balance evaluation value (WB evaluation value), and AE evaluation value, the same arrangement can be applied.

Figure 3:
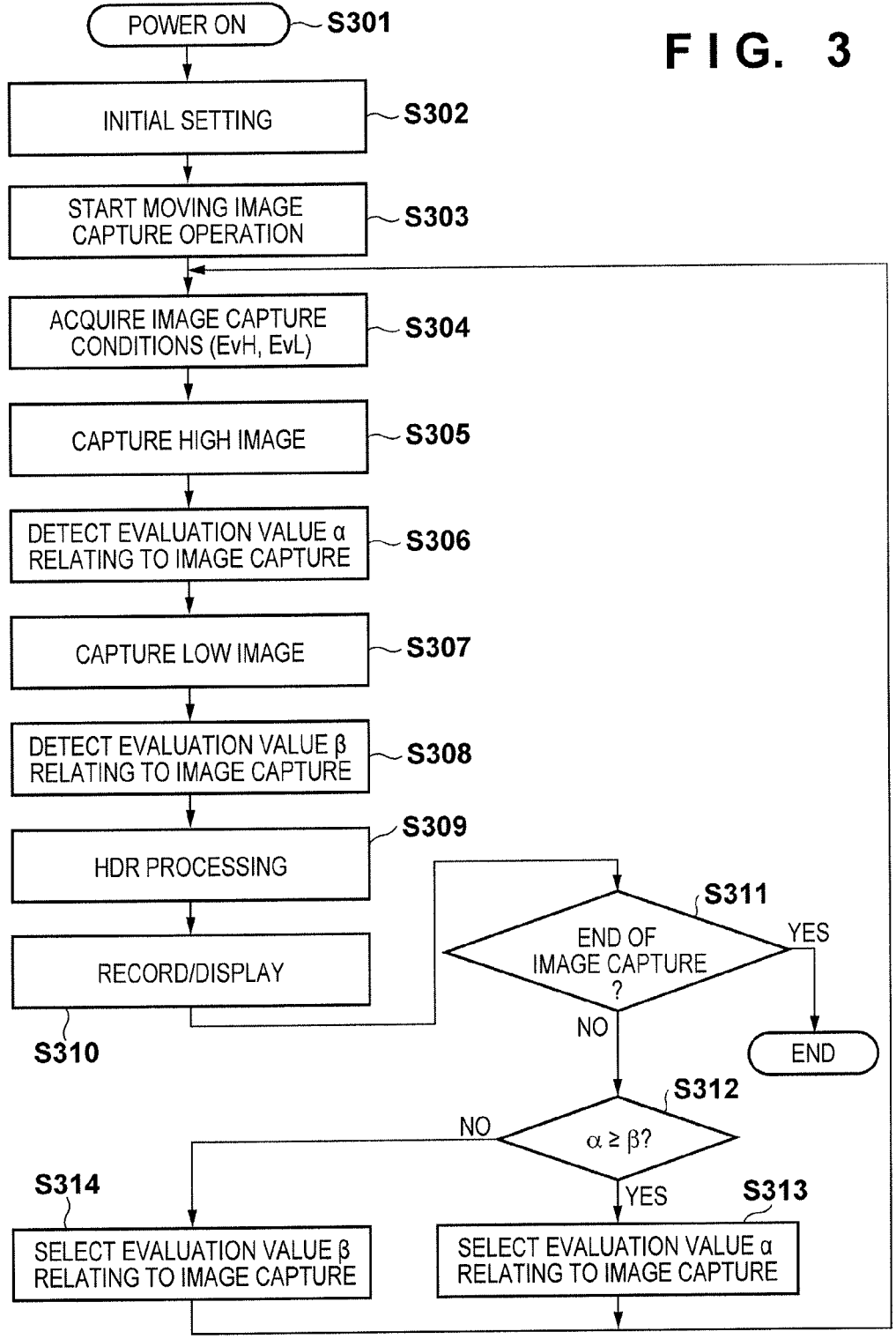
FIG. 3 is a flowchart for explaining the HDR moving image capture operation of the image capture apparatus according to the first embodiment of the present invention.

That is, as shown in FIG. 3, other evaluation values relating to image capture are respectively detected from a High image in step S306 and from a Low image in step S308, and an optimal value is selected in step S312. Then, the operation (a calculation operation of a white balance coefficient or determination of an exposure control parameter at the next image capture timing) of the image capture apparatus is controlled based on the selected evaluation value relating to image capture.

Second Embodiment

In the first embodiment, an optimal evaluation value relating to image capture is selected based on the comparison result of those detected from a plurality of images before composition. The second embodiment is characterized by selecting an optimal evaluation value relating to image capture based on information used in detection of an image capture scene.

Figure 4:
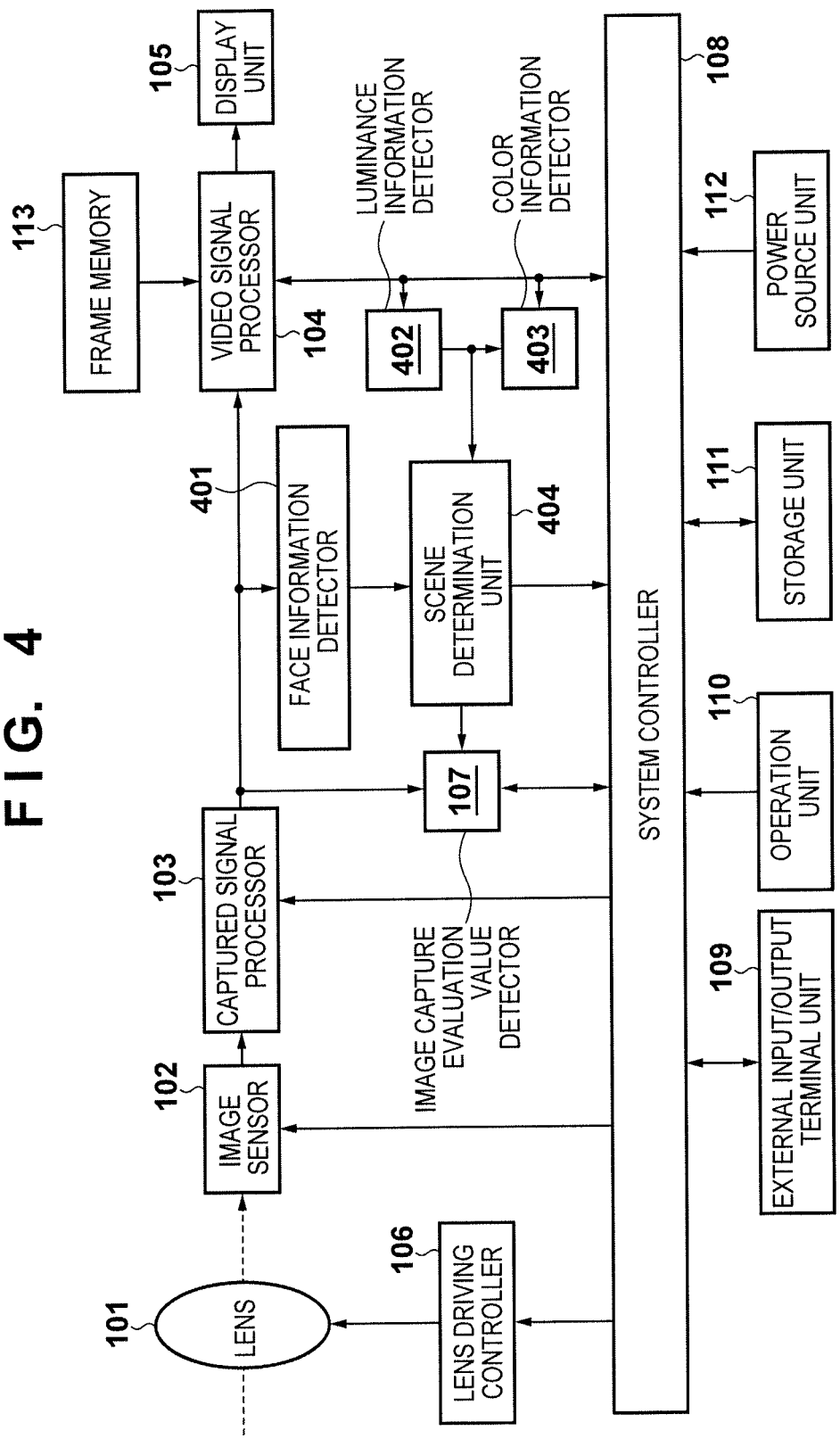
FIG. 4 is a block diagram showing an example of the functional arrangement of an image capture apparatus according to the second embodiment of the present invention.

FIG. 4 is a block diagram showing an example of the functional arrangement of an image capture apparatus according to the second embodiment, and common reference numerals denote units common to those in the image capture apparatus shown in FIG. 1. The image capture apparatus of this embodiment is characterized in that a face information detector 401, luminance information detector 402, color information detector 403, and scene determination unit 404 are added to the image capture apparatus shown in FIG. 1.

The face information detector 401 applies known face detection processing to an image signal output from a captured signal processor 103 to detect a face region of a person or animal (pet or the like) included in an image, and outputs information of the detected face region to the scene determination unit 404 as subject detection information. Note that the subject detection information may be detection information other than a face region.

The luminance information detector 402 divides an image corresponding to a video signal received from a video signal processor 104 into a plurality of regions, and calculates average luminance values of the respective regions.

Then, the luminance information detector 402 calculates, for example, luminance information such as a luminance difference between the central portion and surrounding portion of a frame image or a central luminance value using these average luminance values. The luminance information detected by the luminance information detector 402 is sent to the scene determination unit 404.

The color information detector 403 applies color detection processing to a video signal received from the video signal processor 104, and detects color information such as an average saturation or an area of a high-saturation region. The color information detected by the color information detector 403 is sent to the scene determination unit 404.

The scene determination unit 404 determines based on respective pieces of information sent from the face information detector 401, luminance information detector 402, and color information detector 403 whether or not an image capture scene from a video signal processed by the video signal processor 104 is that which satisfies a specific condition. This determination can be executed based on, for example, the relationship between luminance values of the background and subject, color information of the background, and the presence/absence of detection of a person using a known scene determination technique (also called a scene recognition technique).

The respective pieces of information sent from the face information detector 401, luminance information detector 402, and color information detector 403 are temporarily saved by the scene determination unit 404, and are updated as needed.

Then, the scene determination unit 404 sends information required to change image capture parameters, image processing parameters, and the like according to the determined image capture scene to a system controller 108.

An image capture evaluation value detector 107 selects based on information of the scene determination unit 404 whether to use an evaluation value relating to image capture obtained from a High image or Low image.

A scene determination operation by the scene determination unit 404 will be described below.

The scene determination unit 404 determines the background of an image capture scene for a High image and Low image before HDR processing based on luminance information detected by the luminance information detector 402 and color information detected by the color information detector 403.

Furthermore, the scene determination unit 404 determines a principal subject in the image capture scene for the High and Low image before HDR processing using face information detected by the face information detector 401.

A case will be described first wherein the background of an image capture scene is determined.

The scene determination unit 404 analyzes luminance information detected by the luminance information detector 402 and color information detected by the color information detector 403. Then, when an area of a sky blue region on an image is not less than a threshold, the scene determination unit 404 determines that the background of the image capture scene is blue sky.

Also, the scene determination unit 404 analyzes luminance information detected by the luminance information detector 402 and color information detected by the color information detector 403. Then, when the luminance information detected by the luminance information detector 402 and color information detected by the color information detector 403 are determined that an image luminance satisfies a predetermined condition in association with a histogram distribution or variance, the scene determination unit 404 determines that the background of the image capture scene is a night view.

For example, when a low-luminance portion occupies a large part of a luminance histogram of an image, and high-luminance portions are intermittently distributed, the scene determination unit 404 can determine that the background of the image capture scene is a night view.

Furthermore, the scene determination unit 404 analyzes luminance information detected by the luminance information detector 402 and color information detected by the color information detector 403. Then, when both of an average saturation of an image and an area of a high-saturation region are not less than thresholds, the scene determination unit 404 determines that the image capture scene is a colorful scene.

A case will be described below wherein a principal subject in an image capture scene is determined.

The scene determination unit 404 analyzes face information from the face information detector 401, and when a face is detected from an image signal, it determines that a principal subject in the image capture scene is a person.

In this manner, the scene determination unit 404 determines both the background and subject of the scene, and outputs one determination result as a combination of these determination results to the system controller 108.

For example, when an image of a person is captured in a state in which the background is very bright like in a backlit scene, detection values of luminance information and color information of a Low image are higher, and a detection value of face information of a High image is higher.

On the other hand, when the background is dark and an occupation area of a principal subject is small like in a tunnel scene, detection values of luminance information and color information of a High image are higher, and a detection value of face information of a Low image is higher.

The image capture evaluation value detector 107 selects one of an evaluation value α relating to image capture detected from a High image and an evaluation value β relating to image capture detected from a Low image based on information obtained from the scene determination unit 404.

Figure 5:
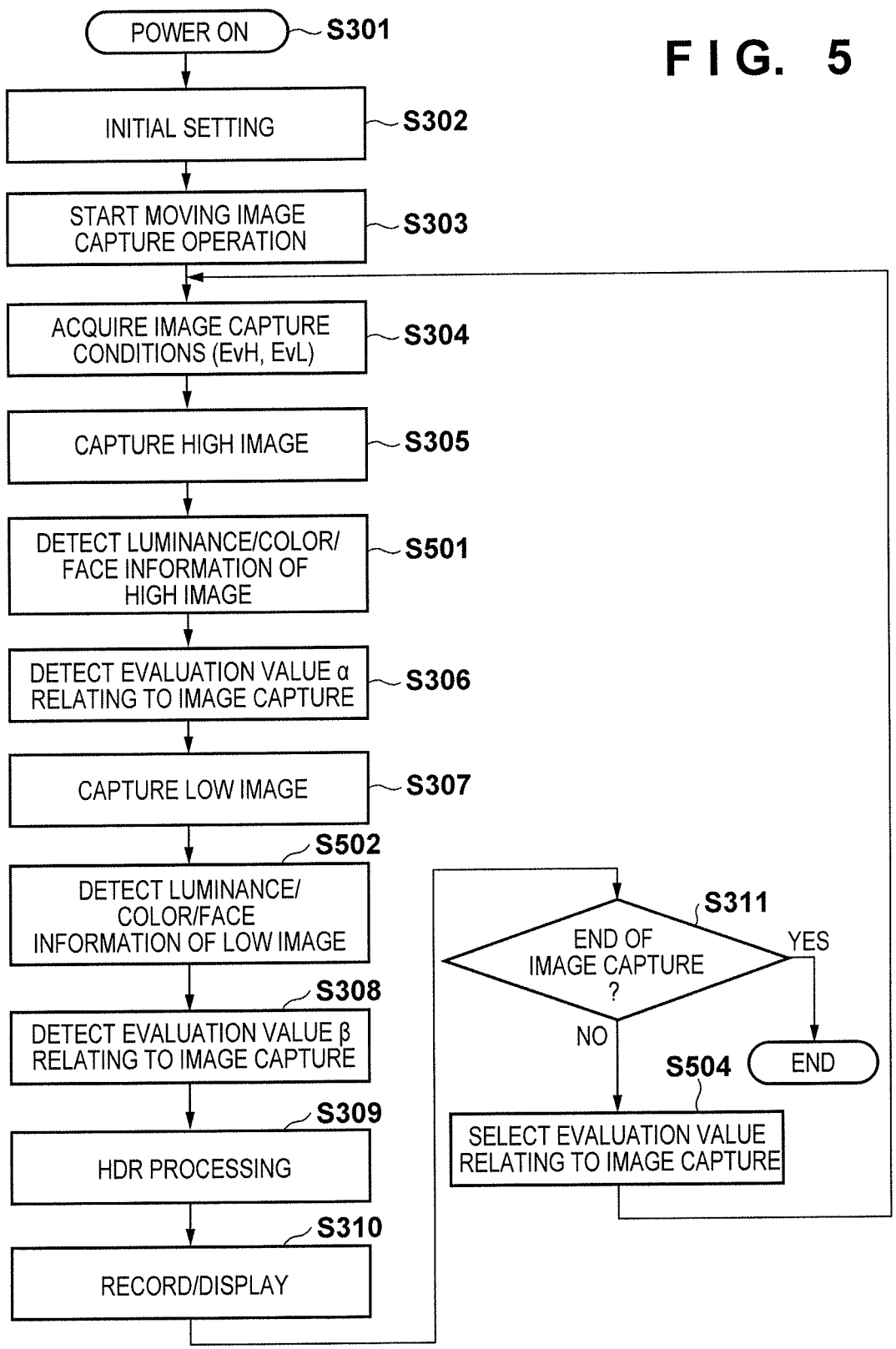
FIG. 5 is a flowchart for explaining the HDR moving image capture operation of the image capture apparatus according to the second embodiment of the present invention.

An HDR moving image capture operation of the image capture apparatus of this embodiment will be described in detail below with reference to the flowchart shown in FIG. 5. Note that in FIG. 5, the same step numbers as in FIG. 3 denote steps which execute the same processes as those of the first embodiment, and a repetitive description thereof will be avoided. In the following description, let Xh be a face information detection value detected from a High image, Yh be a luminance information detection value, and Zh be a color information detection value. Also, let Xl be a face information detection value detected from a Low image, Yl be a luminance information detection value, and Zl be a color information detection value. Note that as face information, luminance information, and color information used in comparison, predetermined one of a plurality of types of information detected by the detectors 401 to 403 may be used, or a plurality of types of information may be converted into one value under a predetermined condition.

The image capture evaluation value detector 107 compares information values of face information X, luminance information Y, and color information Z detected respectively from a Low image and High image, and selects evaluation values α and β relating to image capture, as shown in, for example, FIG. 6. FIG. 6 shows which of the evaluation values α and β relating to image capture is selected based on combinations of the magnitude relations of face information, luminance information, and color information.

Note that the image capture evaluation value detector 107 may select the evaluation values α and β relating to image capture based on the scene determination result of the scene determination unit 404, as shown in FIG. 6. When the scene determination result is used, the need for comparing individual pieces of information can be obviated.

After a High image is acquired in step S305, the face information detector 401 detects face information Xh, the luminance information detector 402 detects luminance information Yh, and the color information detector 403 detects color information Zh from the High image in step S501.

Also, in step S502, the face information detector 401 detects face information Xl, the luminance information detector 402 detects luminance information Yl, and the color information detector 403 detects color information Zl from a Low image acquired in step S307.

If an image capture operation end instruction is input in step S311, the system controller 108 ends the processing. On the other hand, if the image capture operation is to be continued, the process advances to step S504.

In step S504, the image capture evaluation value detector 107 determines an evaluation value relating to image capture to be reflected to the next image capture operation from the respective values detected from the High image in step S501 and the respective values detected from the Low image in step S502.

For example, if the relations of the respective values are:

face information value: Xh≤Xl luminance information value: Yh>Yl color information value: Zh>Zl the image capture evaluation value detector 107 selects an evaluation value α relating to image capture detected from the High image. Note that since these relations are also satisfied when the scene determination unit 404 determines a backlit scene, the image capture evaluation value detector 107 can immediately select the evaluation value α relating to image capture if the scene determination unit 404 determines the backlit scene.

Likewise, if the relations of the respective values are:

face information value: Xh>Xl luminance information value: Yh≤Yl color information value: Zh≤Zl the image capture evaluation value detector 107 selects an evaluation value β relating to image capture detected from the Low image. Note that since these relations are also satisfied when the scene determination unit 404 determines a tunnel scene, the image capture evaluation value detector 107 can immediately select the evaluation value β relating to image capture if the scene determination unit 404 determines the tunnel scene.

The evaluation value relating to image capture selected in step S504 is reflected to the next image capture operation.

In the second embodiment, when HDR processing is executed in a live view mode or upon recording a moving image, an optimal evaluation value relating to image capture is selected based on the scene determination result or information used in scene determination, thereby obtaining an accurate HDR result in a moving image.

Upon execution of scene determination in this embodiment, face information, luminance information, and color information are detected from each of a High image and Low image. However, other methods may be used. For example, respective pieces of information may be detected from images before composition or an HDR image one frame before.

This embodiment has explained scene determination using face information, luminance information, and color information. Alternatively, some of these pieces of information may be used, or a larger number of types of information may be used to execute scene determination and to select an evaluation value relating to image capture.

In this embodiment, an evaluation value relating to image capture detected from an image corresponding to at least two of face information, luminance information, and color information, which assume large values, is selected. However, the respective information values may be weighted and compared.

This embodiment has explained the case in which two images, that is, High and Low images are to be composited. Also, the same arrangement is applicable to a case in which three or more images, that is, High, Low, and middle images are to be composited.

Third Embodiment

The third embodiment of the present invention will be described below. In this embodiment, the arrangement of the first embodiment is applied to that which can acquire a plurality of images having different exposure amount within one frame period.

Figure 7:
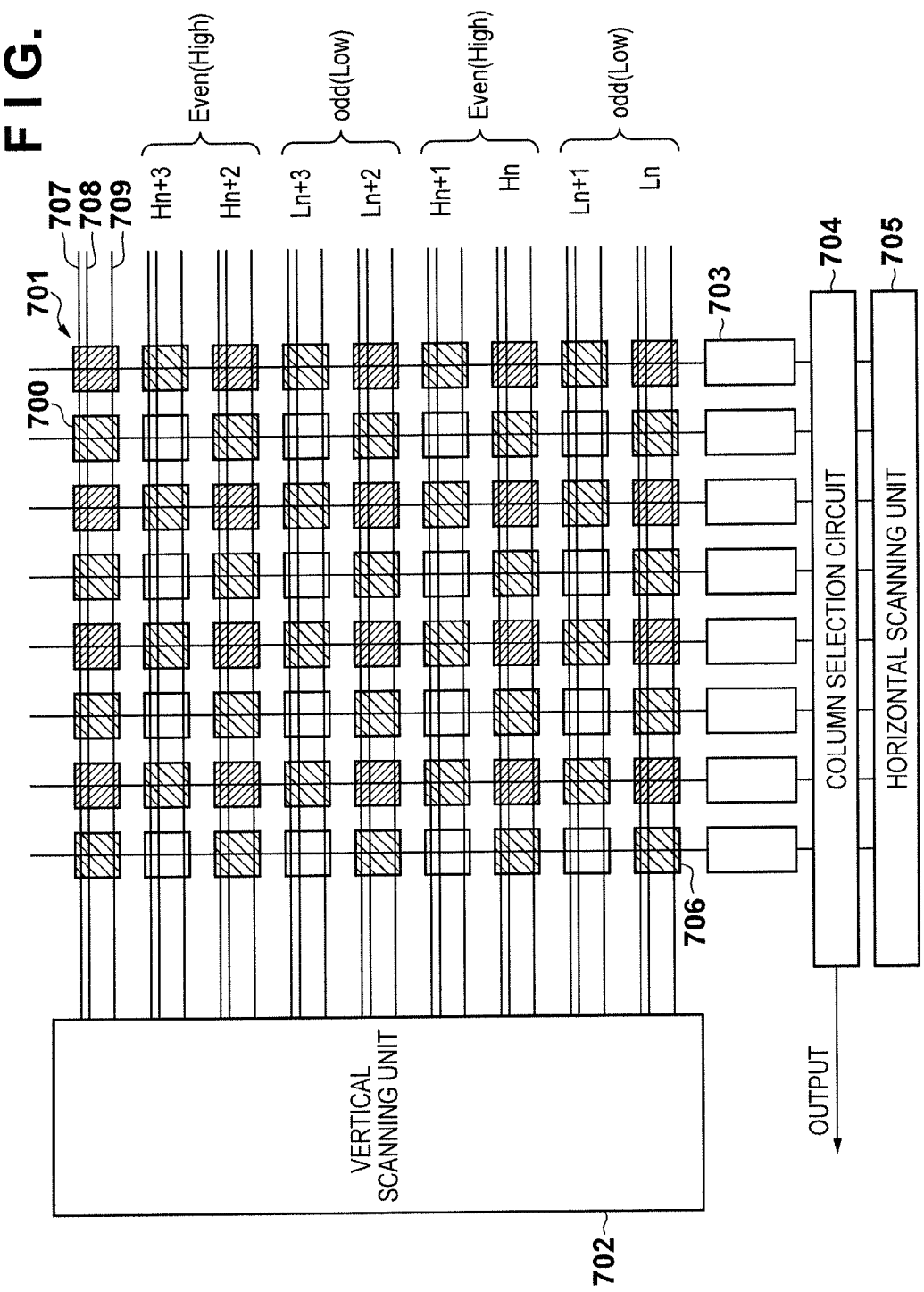
FIG. 7 is a block diagram showing an example of the arrangement of an image sensor of an image capture apparatus according to the third embodiment of the present invention.

FIG. 7 is a block diagram showing an example of the arrangement of a CMOS image sensor as an example of an image sensor 102. The image sensor 102 includes a pixel array unit 701 in which unit pixels (to be also simply referred to as "pixels" hereinafter) 700 each including a photoelectric conversion element are two-dimensionally arranged in a matrix pattern. The image sensor 102 includes, for example, a vertical scanning unit 702, column signal processing circuits 703, column selection circuit 704, horizontal scanning unit 705, and the like as peripheral circuits of the pixel array unit 701.

To the unit pixels 700, vertical signal lines 706 are wired, and drive control lines, for example, a reset control line RST 707, transfer control line TRS 708, and selection control line SEL 709 are wired for each line.

Figure 8:
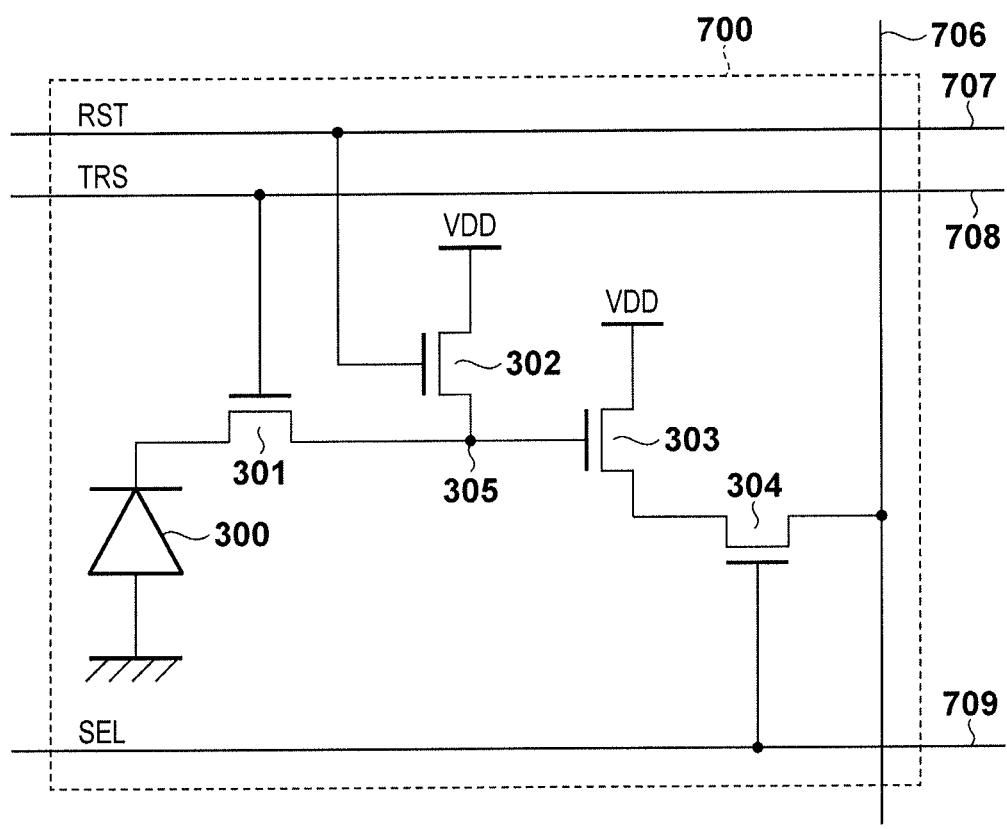
FIG. 8 is a circuit diagram showing an example of the arrangement of a unit pixel shown in FIG. 7.

FIG. 8 shows an example of the circuit arrangement of the unit pixel 700.

The unit pixel 700 adopts a pixel arrangement having four transistors, for example, a transfer transistor 301, reset transistor 302, amplifier transistor 303, and selection transistor 304 in addition to a photoelectric conversion element, for example, a photodiode 300.

The transfer transistor 301 is connected between the cathode electrode of the photodiode 300 and a floating diffusion 305 as a charge-voltage conversion unit.

The gate electrode of the transfer transistor 301 is connected to the transfer control line TRS 708. When a transfer pulse is applied from the transfer control line TRS 708 to the gate electrode (control electrode), the transfer transistor 301 transfers a signal charge accumulated by photoelectric conversion of the photodiode 300 to the floating diffusion 305.

The drain electrode of the reset transistor 302 is connected to a pixel power source VDD, and the source electrode is connected to the floating diffusion 305. The gate electrode of the reset transistor 302 is connected to the reset control line RST 707.

Prior to transfer of a signal charge from the photodiode 300 to the floating diffusion 305, a reset pulse is applied from the reset control line RST 707 to the gate electrode of the reset transistor 302. Thus, a potential of the floating diffusion 305 can be reset to a predetermined potential.

The gate electrode of the amplifier transistor 303 is connected to the floating diffusion 305, and the drain electrode is connected to the pixel power source VDD. The amplifier transistor 303 outputs a potential of the floating diffusion 305 after it is reset by the reset transistor 302 as a reset level.

Furthermore, the amplifier transistor 303 outputs a potential of the floating diffusion 305 after a signal charge is transferred by the transfer transistor 301 as a signal level.

The drain electrode of the selection transistor 304 is connected to, for example, the source electrode of the amplifier transistor 303, and the source electrode is connected to the vertical signal line 706.

Also, the gate electrode of the selection transistor 304 is connected to the selection control line SEL 709. The selection transistor 304 is enabled when a selection pulse is applied to the gate electrode, so as to set the unit pixel 700 in a selected state, thus outputting an electrical signal output from the amplifier transistor 303 onto the vertical signal line 706.

Note that the selection transistor 304 may be connected between the pixel power source VDD and the drain electrode of the amplifier transistor 303.

The aforementioned arrangement of the unit pixel is an example. For example, a three-transistor arrangement may be adopted, that is, the selection transistor 304 may be omitted, and the amplifier transistor 303 may be commonly used as the selection transistor 304. Alternatively, an arrangement in which the amplifier transistor 303 is shared by a plurality of unit pixels may be adopted. Other arrangements may also be adopted.

The vertical scanning unit 702 shown in FIG. 7 includes a line selection circuit and driver circuit.

The line selection circuit includes a shift register, address decoder, or the like, and generates pixel drive pulses such as a transfer pulse, reset pulse, and selection pulse required to vertically scan the unit pixels 700 for each line under the control of the system controller 108.

The driver circuit supplies a transfer pulse, reset pulse, and selection pulse having predetermined voltages required to enable/disable the transistors 301, 302, and 304 of the unit pixels 700 to the unit pixels 700 in synchronism with vertical scanning by the line selection circuit. Also, the driver circuit is configured to supply a transfer pulse having an intermediate voltage lower than the predetermined voltage to the unit pixels 700.

The column signal processing circuits 703 are arranged in correspondence with respective columns of the pixel array unit 701.

Each column signal processing circuit 703 applies predetermined signal processing to an electrical signal output from the corresponding unit pixel 700 of a read line selected by the vertical scanning via the vertical signal line 706 to generate a pixel signal according to a signal charge read out from the unit pixel 700, and temporarily holds the pixel signal.

For example, each column signal processing circuit 703 may execute similar signal processing in place of a captured signal processor 103. For example, each column signal processing circuit 703 can execute CDS (Correlated Double Sampling) processing. The CDS processing reduces reset noise and fixed pattern noise unique to a pixel such as a threshold variation of the amplifier transistor 303. Also, each column signal processing circuit 703 can execute A/D conversion processing for converting an analog signal into a digital signal.

The column selection circuit 704 includes a shift register, address decoder, and the like. The column selection circuit 704 performs horizontal scanning for each pixel column of the pixel array unit 701, and controls the horizontal scanning unit 705 to read out pixel signals temporarily held by the column signal processing circuits 703 in a horizontal scanning order.

The horizontal scanning unit 705 includes a horizontal selection switch and the like, and sequentially reads out pixel signals temporarily held by the column signal processing circuits 703 by the horizontal scanning of the column selection circuit 704, thus outputting image signals for respective lines.

A system controller 108 controls the operations of the vertical scanning unit 702 and column selection circuit 704 to scan the unit pixels 700 of the pixel array unit 701 in a vertical direction for respective lines, thus outputting, by the horizontal scanning, signals of respective pixels read out by this vertical scanning.

In this embodiment, as shown in FIG. 7, using two neighboring lines as one unit, a long-term exposure Even line and short-term exposure Odd line are set to control scanning of the pixel array unit 701.

A currently commercially available 1-CCD type color image sensor includes a color filter of a primary color Bayer matrix, in which R, G1, B, and G2 pixels are regularly arranged to have vertical and horizontal two pixels as repetition units. In this embodiment, the following arrangement will be given under the assumption that the image sensor 102 includes a color filter of a primary color Bayer matrix.

Since the Bayer matrix uses four pixels, that is, vertical and horizontal two pixels as a repetition unit, this embodiment defines two neighboring lines configured by repetition units of the Bayer matrix as one pixel region, and a long-term exposure Even line and short-term exposure Odd line are set for each pixel region. In FIG. 7, lines (Ln, Ln+1) and (Ln+2, Ln+3) are respectively set as Odd lines, and lines (Hn, Hn+1) and (Hn+2, Hn+3) are respectively set as Even lines. The short-term exposure Odd line and long-term exposure Even line neighbor in the vertical direction.

Figure 9:
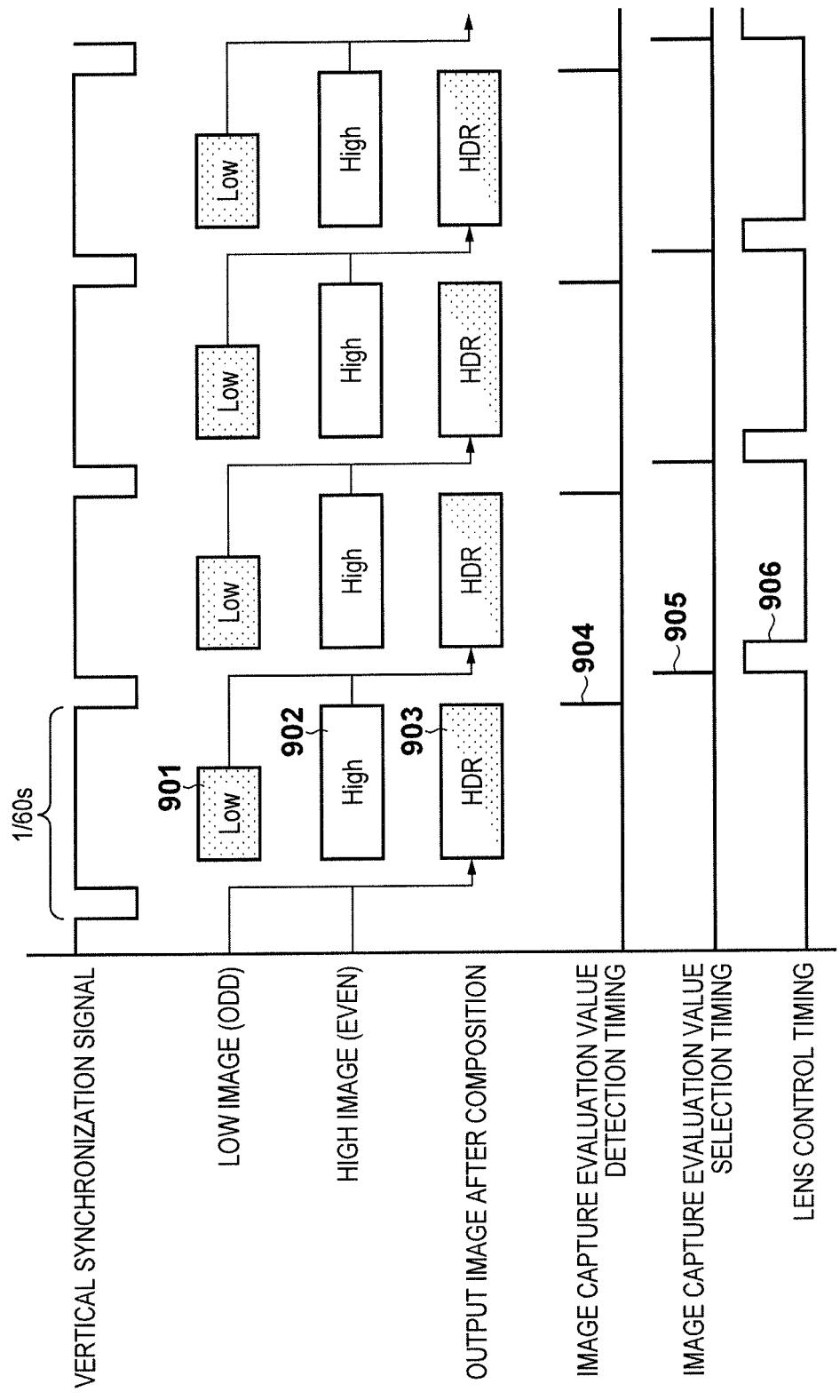
FIG. 9 is a timing chart for explaining the HDR moving image capture operation of the image capture apparatus according to the third embodiment of the present invention.

FIG. 9 is a timing chart for explaining operation timings of an HDR moving image capture operation in the image capture apparatus of this embodiment. In this case, assume that a frame rate of an HDR moving image is 60 frames/sec (fps). One frame of an HDR moving image is generated from two images. In this embodiment, since two images having different exposure amounts are acquired within one frame period (by a single image capture operation), an image capture frame rate is 60 fps. Note that these frame rates are examples, and other frame rates may be used.

In response to an image capture synchronization signal (vertical synchronization signal) of a 1/60s cycle generated by the system controller 108, an image capture operation is executed for one frame period.

In this embodiment, the system controller 108 simultaneously executes image capture and exposure operations of a Low image 901 and High image 902 within one frame period. Note that, for example, a High image is an overexposure image captured under an exposure condition Ev(H), which is brighter by one level (+1 level) than a standard exposure level Ev(0), and the Low image is an underexposure image captured under an exposure condition Ev(L) which is darker by one level (−1 level) than the standard exposure level.

The Low image 901 and High image 902, which are acquired within one frame period, are temporarily stored in a frame memory 113. After the Low and High images are obtained, a video signal processor 104 composites the two images in the next frame period, thus generating an HDR image 903.

An image capture evaluation value detector 107 detects predetermined evaluation values relating to image capture respectively from the Low image 901 and High image 902 according to an image capture evaluation value extraction timing 904 output from the system controller 108.

Furthermore, the image capture evaluation value detector 107 selects an evaluation value relating image capture, which is determined to be more appropriate than the other so as to be used in the HDR moving image capture operation, according to an image capture evaluation value selection timing 905 output from the system controller 108.

When evaluation values relating to image capture are to be obtained from a composite image, they are obtained after composition processing. However, in this embodiment, evaluation values relating to image capture can be selected and reflected at a timing before the beginning of the composition processing, thus improving the response of processing which uses the evaluation values relating to image capture.

The system controller 108 controls a focusing lens position via a lens driving controller 106 based on an AF evaluation value of the evaluation values relating to image capture selected at an image capture evaluation value selection timing, thereby adjusting an in-focus distance of a lens 101. The system controller 108 executes control of the focusing lens position within one cycle of a lens control timing 906, that is, one cycle (1/60 sec) of an output synchronization signal.

Figure 10:
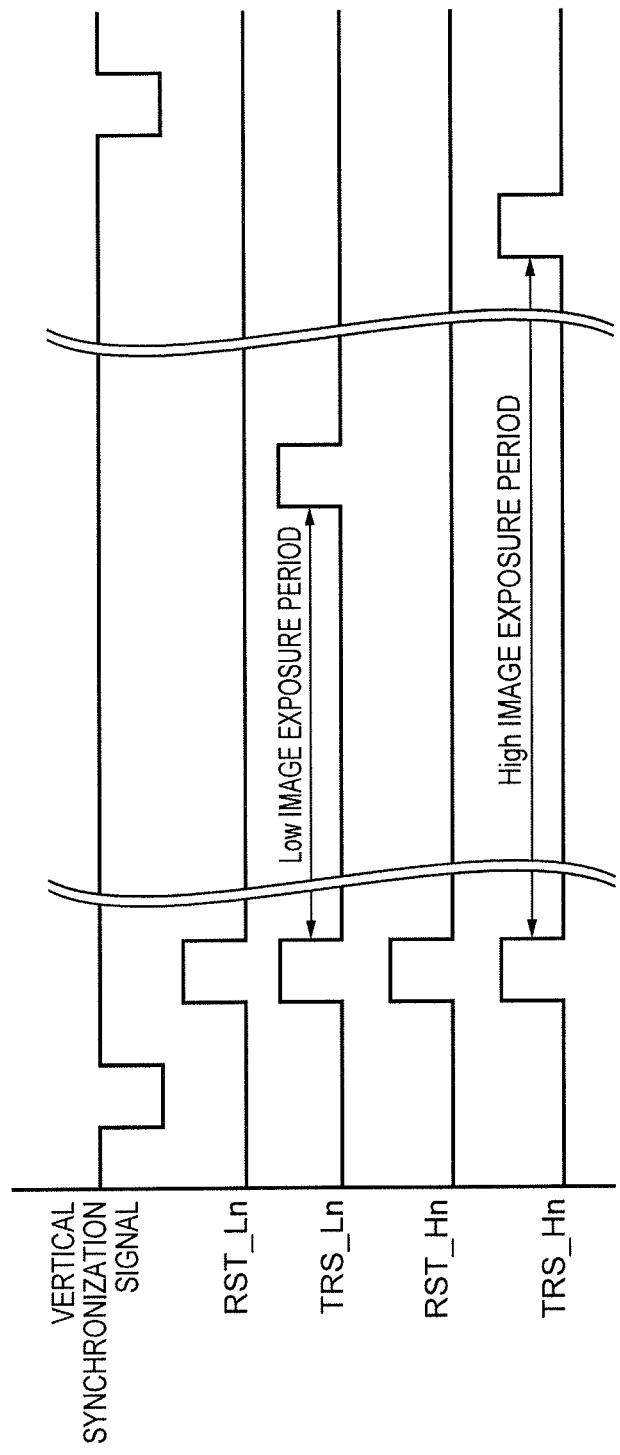
FIG. 10 is a timing chart for explaining the operation of a vertical scanning unit in the HDR moving image capture operation of the image capture apparatus according to the third embodiment of the present invention.

FIG. 10 is a timing chart of signals generated by the vertical scanning unit 702 so as to acquire Low and High image required to generate an HDR image within one frame period. FIG. 10 shows signal timings of a reset control line RST_Ln and transfer control line TRS_Ln of short-term exposure Odd lines, and a reset control line RST_Hn and transfer control line TRS_Hn of long-term exposure Even lines.

When a transfer control line TRS signal and reset control line RST signal go high, charges of the photodiodes 300 are reset, and exposure (charge accumulation) is started. This operation is sequentially executed for respective lines of the pixel array unit 701 in a predetermined order under a condition set by the system controller 108.

After that, in the Odd lines for a Low image, after an elapse of an exposure time required to acquire a Low image, TRS_Ln signals for the Odd lines sequentially go high. Thus, charges accumulated on the photodiodes 300 are read out to the selection transistors 304 and are output via the column selection circuit 704. The Low image 901 is obtained from these signals.

Then, after an elapse of an exposure time required to obtain a High image, TRS_Hn signals sequentially go high, and charges accumulated on the photodiodes 300 are read out to the selection transistors 304 and are output via the column selection circuit 704. The High image 902 is obtained from these signals.

An HDR moving image capture operation of the image capture apparatus of this embodiment will be described in detail below with reference to the flowchart shown in FIG. 11. Note that in the following description, let $\alpha$ be an evaluation value relating to image capture detected from a High image, and $\beta$ be an evaluation value relating to image capture detected from a Low image.

Figure 11:
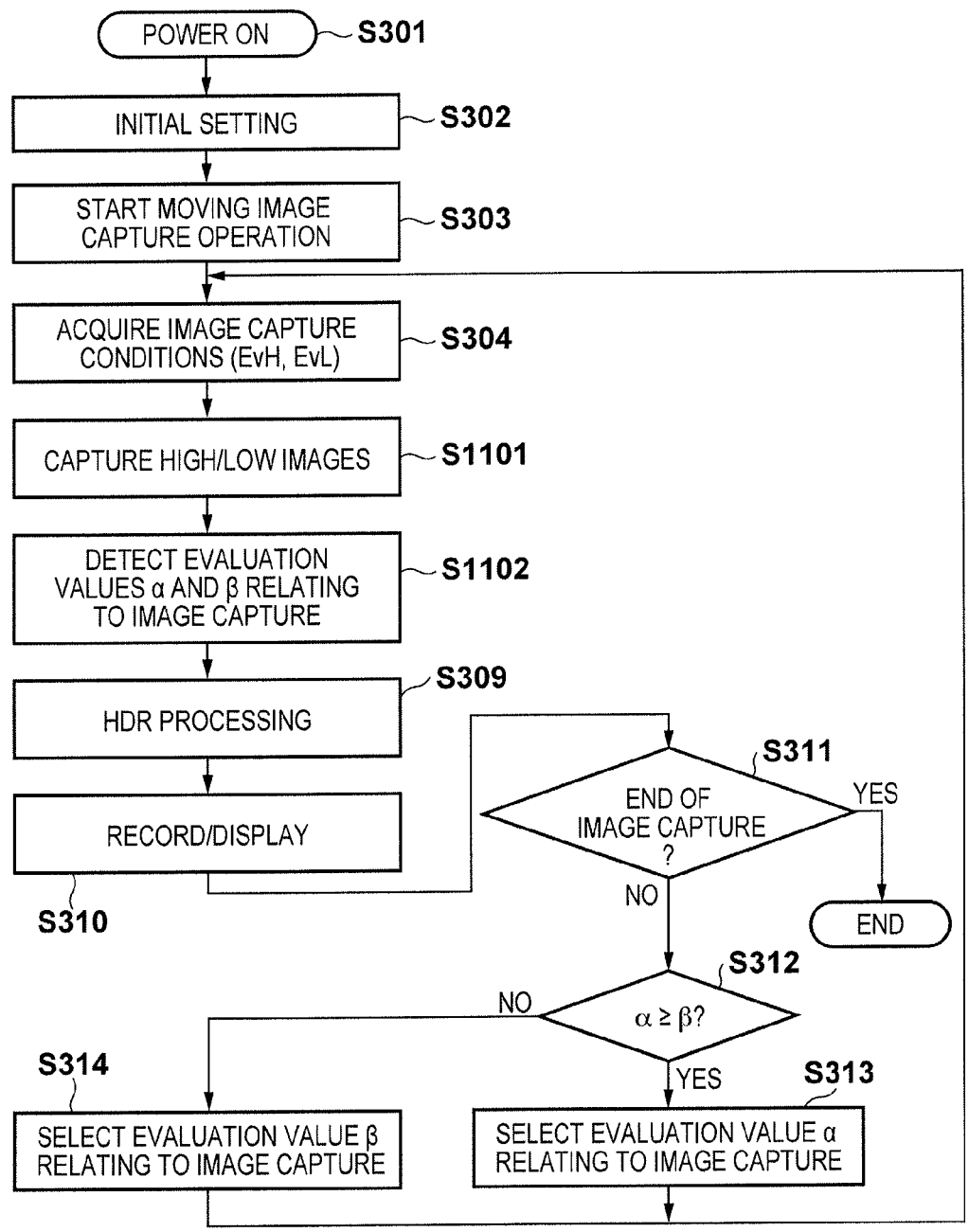
FIG. 11 is a flowchart for explaining the HDR moving image capture operation of the image capture apparatus according to the third embodiment of the present invention.

In FIG. 11, the same step numbers as in FIG. 3 denote steps which execute the same processes as those described in the first embodiment, a description thereof will not be repeated, and processing steps different from the first embodiment will be described. As can be seen from comparison between FIGS. 3 and 11, in this embodiment, High and Low image acquisition operations in steps S305 and S307 in FIG. 3 are replaced by step S1101, and detection operations of evaluation values $\alpha$ and $\beta$ relating to image capture in steps S306 and S308 are replaced by step S1102.

In step S1101, the system controller 108 generates timing pulses according to exposure conditions Ev(H) and Ev(L) determined in step S304, and supplies them to Even and Odd lines of the image sensor 102. Thus, a Low image can be acquired from the Odd lines and a High image can be acquired from the Even liens within one frame period. The system controller 108 saves the acquired Low and High images in the frame memory 113.

In step S1102, the image capture evaluation value detector 107 detects an evaluation value $\alpha$ relating to image capture for the High image and an evaluation value $\beta$ relating to image capture for the Low image with reference to the frame memory 113.

Since other processes are the same as those in the first embodiment, a description thereof will not be repeated.

As described above, the first embodiment can be applied to the image capture apparatus which acquires a plurality of images having different exposure amounts within one frame period, and composites them to obtain an HDR image.

Note that upon selection of an AF evaluation value, an optimal AF evaluation value may be selected by comparing histograms of focus detection areas in place of comparison of contrast AF evaluation values.

Figure 12:
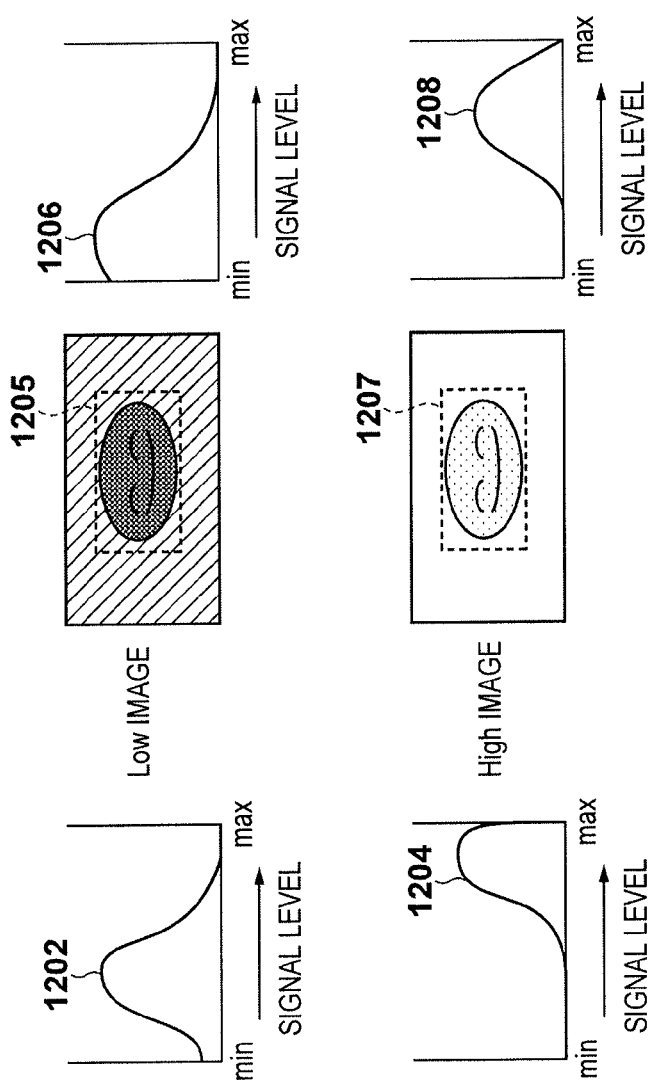
FIGS. 12A and 12B are views for explaining selection operations of evaluation values relating to image capture using histograms in the image capture apparatus according to the third embodiment of the present invention.

FIGS. 12A and 12B show examples of High and Low images, and examples of corresponding histograms.

In FIG. 12A, a histogram 1202 indicates a signal level distribution of a focus detection area 1201 of a Low image, and a histogram 1204 indicates a signal level distribution of a focus detection area 1203 of a High image. The signal level can be a luminance level. The image capture evaluation value detector 107 generates the histograms 1202 and 1204, and then calculates the numbers of signal level min values and those of max values in the respective histograms for the High and Low images.

In FIG. 12A, let min_la be the number of min values in a Low image, and max_la be the number of max values. Also, let min_ha be the number of min values in a High image, and max_ha be the number of max values. In the histograms 1202 and 1204 shown in FIG. 12A, the following relations are met.

min_la<max_la min_ha<max_ha

In this case, the image capture evaluation value detector 107 compares the larger numbers of values in the respective images, that is, the number max_la in the Low image and the number max_ha in the High image in the example of FIG. 12A.

In this example, since max_la<max_ha, the histogram 1204 for the focus detection area 1203 of the High image suggests a highlight-detail loss since the number of pixels of high signal levels is large.

On the other hand, in the histogram 1202 for the focus detection area 1201 of the Low image, since signal levels are distributed to the center compared to the High image, and a possibility of a highlight-detail loss is low. For this reason, the image capture evaluation value detector 107 selects the evaluation value β relating to image capture detected from the Low image in step S312 in the example of FIG. 12A.

FIG. 12B shows an example of a backlit scene or the like, and a histogram 1206 of a focus detection area 1205 of a Low image indicates that the number of pixels with low signal levels is large.

In FIG. 12B, let min_lb be the number of min values in a Low image, and max_lb be the number of max values. Also, let min_hb be the number of min values in a High image, and max_hb be the number of max values. In this case, the following relations are obtained from the histograms of the respective images.

$$min\_lb > max\_lb$$

$$min\_hb < max\_hb$$

In this case, the image capture evaluation value detector 107 compares the larger numbers of values in the respective images, that is, the number min_lb in the Low image and the number max_hb in the High image in the example of FIG. 12B.

In this example, since min_lb<max_hb, the histogram 1206 for the focus detection area 1205 of the Low image suggests generation of a shadow-detail loss since the number of pixels of low signal levels is large.

On the other hand, in a histogram 1208 in a focus detection area 1207 of the High image, since signal levels are distributed to the center compared to the Low image. For this reason, the image capture evaluation value detector 107 selects the evaluation value α relating to image capture detected from the High image in step S312 in the example of FIG. 12B.

In this manner, an AF evaluation value may be selected according to the numbers of min values and those of max values detected from High and Low images.

Note that as the histogram comparison example, the method of comparing the numbers of pixels having min values and max values has been described. Alternatively, by adopting another method for comparing the number of pixels not less than a predetermined threshold and that of pixels less than the threshold, an optimal evaluation value relating to image capture can be detected.

The AF evaluation value as an example of evaluation values relating to image capture has been described. Alternatively, an optimal evaluation value can be detected by the same arrangement from other evaluation values relating to image capture, for example, WB evaluation values or AE evaluation values.

In WB evaluation values or AE evaluation values, they are also detected from High and Low images acquired in step S1102 in FIG. 11.

Then, in step S313 or S314, parameters required for development are calculated based on the selected WB evaluation value. As for AE evaluation values, a control value of an aperture, shutter speed, and sensitivity are calculated based on an AE evaluation value selected in step S313 or S314 to obtain a standard exposure value in an image capture operation of the next frame.

As described above, even in the apparatus which acquires a plurality of images having different exposure amounts within one frame period, the same effects as in the first embodiment can be obtained.

Fourth Embodiment

The fourth embodiment of the present invention will be described below. In this embodiment, the arrangement of the second embodiment is applied to the arrangement which can acquire a plurality of images having different exposure amounts within one frame period.

Since the functional arrangement of an image capture apparatus according to this embodiment can be the same as that of the second embodiment (FIG. 4), a description thereof will not be given.

Figure 13:
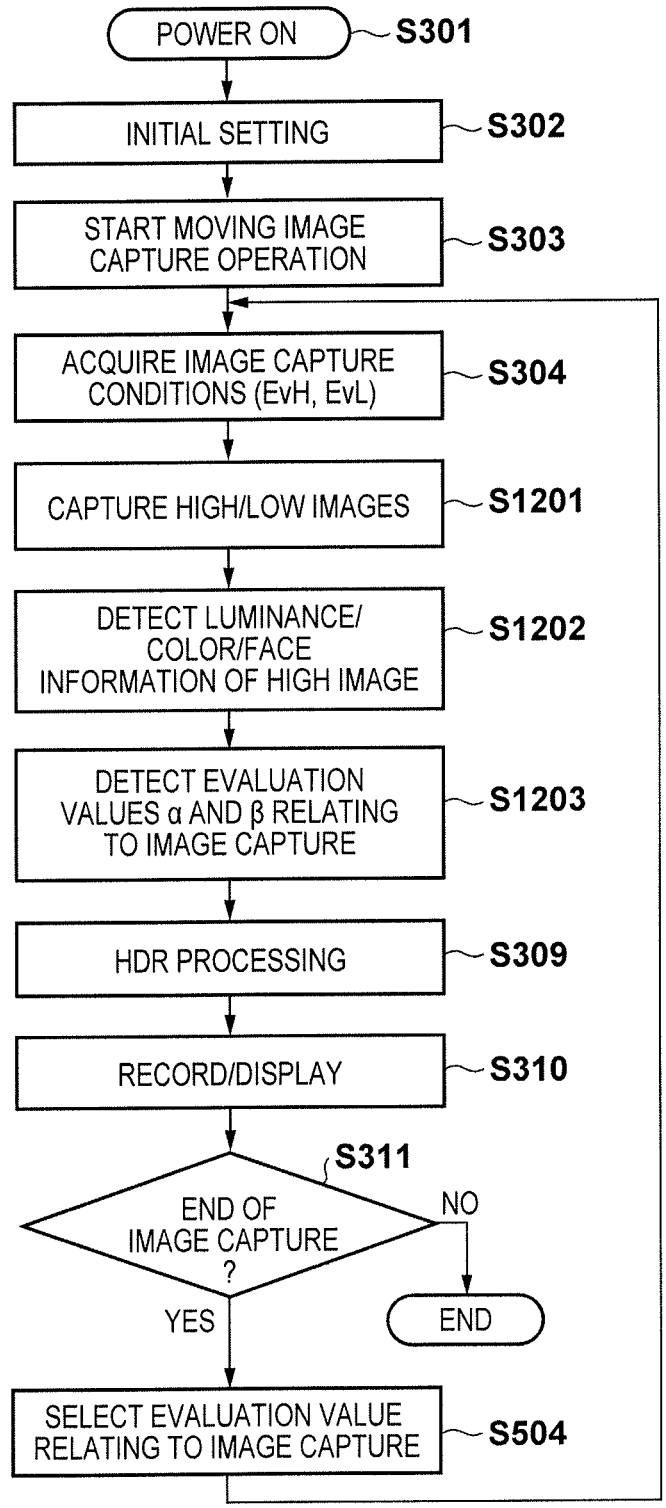
FIG. 13 is a flowchart for explaining the HDR moving image capture operation of an image capture apparatus according to the fourth embodiment of the present invention.

An HDR moving image capture operation of the image capture apparatus of this embodiment will be described below with reference to the flowchart shown in FIG. 13. Note that in FIG. 13, the same step numbers as in FIG. 5 denote steps which execute the same processes as those in the second embodiment, and a repetitive description thereof will be avoided.

In step S1201, a Low image and High image are acquired within one frame period as in step S1101 in the third embodiment.

In step S1202, the same processes as those of steps S501 and S502 are executed.

In step S1203, the same processes as those of steps S306 and S308 are executed.

Other processing steps are the same as those in the second embodiment.

In this manner, even in the apparatus which acquires a plurality of images having different exposure amounts within one frame period, the same effects as in the second embodiment can be obtained.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2013-44716, filed on Mar. 6, 2013, which is hereby incorporated by reference herein its entirety.

What is claimed is:

1. An image capture apparatus comprising:
an image capture unit including an image sensor that periodically captures a set of images having different exposure amounts;
a video signal processor that generates a frame image of an HDR moving image by compositing the set of images having different exposure amounts captured by the image capture unit;
an evaluation value detector that detects evaluation values from at least two out of the set of images having different exposure amounts captured by the image capture unit and that selects a greater one of a plurality of evaluation values detected by the evaluation value detector; and
a system controller that controls an operation of the image capture apparatus for capturing a next set of images, based on the evaluation value selected by the evaluation value detector.

2. The apparatus according to claim 1, wherein the evaluation values include an exposure evaluation value, and the system controller controls the exposure amount for capturing the next set of images used by the image capture unit based on the exposure evaluation value selected by the evaluation value detector.

3. The apparatus according to claim 1, wherein the evaluation values include a focus evaluation value, and the system controller controls focus adjustment of the image capture unit for capturing the next set of images based on the focus evaluation value selected by the evaluation value detector.

4. The apparatus according to claim 1, wherein the evaluation values include a white balance evaluation value, and the system controller further controls white balance processing of the image capture unit based on the white balance evaluation value selected by the evaluation value detector.

5. The apparatus according to claim 1, wherein the evaluation value detector performs the selection based on a comparison result of a plurality of evaluation values detected by the evaluation value detector.

6. A control method of an image capture apparatus which comprises an image capture unit including an image sensor, comprising:
periodically capturing, by the image capture unit, a set of images having different exposure amounts, which are to be used to generate a composite image;
generating a frame image of an HDR moving image by compositing the set of images having different exposure amounts captured by the image capture unit;
detecting evaluation values from at least two out of the set of images having the different exposure amounts captured by the image capture unit;
selecting a greater one of a plurality of evaluation values detected in the detecting; and
controlling an operation of the image capture apparatus for capturing a next set of images, based on the evaluation value selected in the detecting.

7. A non-transitory computer-readable storage medium storing a program causing a computer of an image capture apparatus having an image capture unit including an image sensor to perform a control method comprising:
periodically capturing, by the image capture unit, a set of images having different exposure amounts, which are to be used to generate a composite image;
generating a frame image of an HDR moving image by compositing the set of images having different exposure amounts captured by the image capture unit;
detecting evaluation values from at least two out of the set of images having the different exposure amounts captured by the image capture unit;
selecting a greater one of a plurality of evaluation values detected in the detecting; and
controlling an operation of the image capture apparatus for capturing a next set of images, based on the evaluation value selected in the selecting.

* * * * *